US008051096B1

(12) United States Patent
Elbaz et al.

(10) Patent No.: US 8,051,096 B1
(45) Date of Patent: Nov. 1, 2011

(54) METHODS AND SYSTEMS FOR AUGMENTING A TOKEN LEXICON

(75) Inventors: Gilad Israel Elbaz, Santa Monica, CA (US); Jacob Leon Mandelson, Pasadena, CA (US)

(73) Assignee: Google Inc., Mountain View, CA (US)

( * ) Notice: Subject to any disclaimer, the term of this patent is extended or adjusted under 35 U.S.C. 154(b) by 976 days.

(21) Appl. No.: 10/954,714

(22) Filed: Sep. 30, 2004

(51) Int. Cl.
*G06F 7/00* (2006.01)

(52) U.S. Cl. ........................................................ 707/778
(58) Field of Classification Search ................ 707/1–206
See application file for complete search history.

(56) References Cited

U.S. PATENT DOCUMENTS

| | | | | |
|---|---|---|---|---|
| 4,270,182 A | * | 5/1981 | Asija | 704/8 |
| 4,450,520 A | * | 5/1984 | Hollaar et al. | 710/65 |
| 4,499,553 A | * | 2/1985 | Dickinson et al. | 715/533 |
| 4,731,735 A | * | 3/1988 | Borgendale et al. | 707/4 |
| 4,775,956 A | * | 10/1988 | Kaji et al. | 704/7 |
| 4,839,853 A | | 6/1989 | Deerwester et al. | |
| 4,862,408 A | * | 8/1989 | Zamora | 707/102 |
| 4,972,349 A | * | 11/1990 | Kleinberger | 707/1 |
| 5,099,426 A | * | 3/1992 | Carlgren et al. | 704/9 |
| 5,325,298 A | | 6/1994 | Gallant | |
| 5,423,032 A | | 6/1995 | Byrd et al. | |
| 5,454,046 A | | 9/1995 | Carman, II | |
| 5,499,360 A | | 3/1996 | Barbara et al. | |
| 5,619,709 A | | 4/1997 | Caid et al. | |
| 5,721,939 A | * | 2/1998 | Kaplan | 704/9 |
| 5,778,363 A | | 7/1998 | Light | |
| 5,778,364 A | | 7/1998 | Nelson | |
| 5,845,278 A | | 12/1998 | Kirsch et al. | |
| 5,873,081 A | * | 2/1999 | Harel | 707/3 |
| 5,878,386 A | * | 3/1999 | Coughlin | 704/10 |
| 5,890,103 A | | 3/1999 | Carus | |
| 5,933,822 A | | 8/1999 | Braden-Harder et al. | |
| 5,963,205 A | * | 10/1999 | Sotomayor | 715/531 |
| 5,963,965 A | * | 10/1999 | Vogel | 715/236 |

(Continued)

FOREIGN PATENT DOCUMENTS

EP 0621542 B1 10/1994

(Continued)

OTHER PUBLICATIONS

Grefenstette, Gregory, "Comparing Two Language Identification Schemes", International Conference on Statistical Analysis of Textual Data, Dec. 11, 1995.

(Continued)

*Primary Examiner* — Hung Q Pham
*Assistant Examiner* — Hubert Cheung
(74) *Attorney, Agent, or Firm* — Fish & Richardson P.C.

(57) ABSTRACT

Methods and systems for augmenting a token lexicon are presented. In one embodiment, a method comprising identifying a first token from a search request, storing the first token in a lexicon data storage, receiving a character string comprising a second token, wherein the second token is substantially similar to the first token, and parsing the character string using the lexicon data storage to resolve the second token is set forth. According to another embodiment, a method comprising identifying a first token from an interne article, storing the first token in a lexicon data storage, receiving a character string comprising a second token, wherein the second token is substantially similar to the first token, and parsing the character string using the lexicon data storage to resolve the second token is set forth.

28 Claims, 2 Drawing Sheets

U.S. PATENT DOCUMENTS

| | | | |
|---|---|---|---|
| 5,966,686 A | 10/1999 | Heidorn et al. | |
| 6,006,222 A | 12/1999 | Culliss | |
| 6,014,665 A | 1/2000 | Culliss | |
| 6,044,375 A | 3/2000 | Shmueli et al. | |
| 6,067,552 A | 5/2000 | Yu | |
| 6,076,051 A | 6/2000 | Messerly et al. | |
| 6,078,916 A | 6/2000 | Culliss | |
| 6,119,164 A | 9/2000 | Basche | |
| 6,134,532 A | 10/2000 | Lazarus et al. | |
| 6,178,419 B1 | 1/2001 | Legh-Smith et al. | |
| 6,182,068 B1 | 1/2001 | Culliss | |
| 6,185,559 B1 | 2/2001 | Brin et al. | |
| 6,230,168 B1 | 5/2001 | Unger et al. | |
| 6,233,575 B1 | 5/2001 | Agrawal et al. | |
| 6,269,189 B1 | 7/2001 | Chanod | |
| 6,269,361 B1 | 7/2001 | Davis et al. | |
| 6,272,456 B1 | 8/2001 | de Campos | |
| 6,285,999 B1 | 9/2001 | Page | |
| 6,289,342 B1 | 9/2001 | Lawrence | |
| 6,289,353 B1 | 9/2001 | Hazlehurst et al. | |
| 6,298,348 B1 | 10/2001 | Eldering | |
| 6,314,419 B1 | 11/2001 | Faisal | |
| 6,324,519 B1 | 11/2001 | Eldering | |
| 6,334,131 B2 | 12/2001 | Chakrabarti et al. | |
| 6,421,675 B1 | 7/2002 | Ryan et al. | |
| 6,453,315 B1 | 9/2002 | Weissman et al. | |
| 6,460,029 B1* | 10/2002 | Fries et al. | 707/3 |
| 6,493,702 B1 | 12/2002 | Adar et al. | |
| 6,513,031 B1* | 1/2003 | Fries et al. | 707/3 |
| 6,526,440 B1 | 2/2003 | Bharat | |
| 6,529,903 B2 | 3/2003 | Smith et al. | |
| 6,542,401 B2 | 4/2003 | Yamauchi et al. | |
| 6,601,059 B1* | 7/2003 | Fries | 707/3 |
| 6,615,209 B1 | 9/2003 | Gomes et al. | |
| 6,640,006 B2 | 10/2003 | Wu et al. | |
| 6,658,423 B1 | 12/2003 | Pugh et al. | |
| 6,665,681 B1* | 12/2003 | Vogel | 707/738 |
| 6,678,409 B1 | 1/2004 | Wu et al. | |
| 6,678,681 B1 | 1/2004 | Brin | |
| 6,714,939 B2 | 3/2004 | Saldanha et al. | |
| 6,725,259 B1 | 4/2004 | Bharat | |
| 6,738,764 B2 | 5/2004 | Mao et al. | |
| 6,754,873 B1 | 6/2004 | Law et al. | |
| 6,766,320 B1 | 7/2004 | Wang et al. | |
| 6,768,991 B2* | 7/2004 | Hearnden | 707/778 |
| 6,810,375 B1 | 10/2004 | Ejerhed | |
| 6,816,857 B1 | 11/2004 | Weissman et al. | |
| 6,826,559 B1 | 11/2004 | Ponte | |
| 6,895,407 B2* | 5/2005 | Romer et al. | 707/104.1 |
| 6,910,003 B1 | 6/2005 | Arnold et al. | |
| 6,922,691 B2* | 7/2005 | Flank | 707/4 |
| 6,941,294 B2* | 9/2005 | Flank | 707/3 |
| 6,944,611 B2* | 9/2005 | Flank et al. | 707/3 |
| 6,968,308 B1 | 11/2005 | Brockett et al. | |
| 7,107,218 B1 | 9/2006 | Preston | |
| 7,194,460 B2* | 3/2007 | Komamura | 707/4 |
| 7,254,774 B2* | 8/2007 | Cucerzan et al. | 715/257 |
| 7,409,334 B1 | 8/2008 | Shoemaker | |
| 7,424,421 B2* | 9/2008 | Okumura | 704/8 |
| 7,499,914 B2* | 3/2009 | Diab et al. | 1/1 |
| 7,698,341 B2 | 4/2010 | Rubendall | |
| 7,747,633 B2 | 6/2010 | Kadiyska et al. | |
| 7,761,458 B1 | 7/2010 | Eshghi et al. | |
| 7,792,814 B2 | 9/2010 | Cohen | |
| 2002/0002450 A1 | 1/2002 | Nunberg et al. | |
| 2002/0002452 A1 | 1/2002 | Christy et al. | |
| 2002/0042791 A1 | 4/2002 | Smith et al. | |
| 2002/0059221 A1 | 5/2002 | Whitehead et al. | |
| 2002/0099700 A1 | 7/2002 | Li | |
| 2002/0123988 A1 | 9/2002 | Dean et al. | |
| 2002/0133481 A1 | 9/2002 | Smith et al. | |
| 2002/0165849 A1 | 11/2002 | Singh et al. | |
| 2002/0194197 A1* | 12/2002 | Flank | 707/104.1 |
| 2003/0069880 A1* | 4/2003 | Harrison et al. | 707/3 |
| 2003/0120640 A1* | 6/2003 | Ohta et al. | 707/3 |
| 2003/0126235 A1 | 7/2003 | Chandrasekar et al. | |
| 2003/0212649 A1* | 11/2003 | Denesuk et al. | 707/1 |
| 2003/0212675 A1* | 11/2003 | Denesuk et al. | 707/5 |
| 2004/0024752 A1 | 2/2004 | Manber et al. | |
| 2004/0059708 A1 | 3/2004 | Dean et al. | |
| 2004/0107195 A1* | 6/2004 | Trepess | 707/3 |
| 2004/0119740 A1 | 6/2004 | Change et al. | |
| 2004/0122811 A1 | 6/2004 | Page | |
| 2004/0225497 A1* | 11/2004 | Callahan | 704/235 |
| 2005/0055365 A1* | 3/2005 | Ramakrishnan et al. | 707/102 |
| 2005/0086065 A1 | 4/2005 | Maion et al. | |
| 2005/0086205 A1 | 4/2005 | Franciosa et al. | |
| 2005/0131872 A1* | 6/2005 | Calbucci et al. | 707/3 |
| 2005/0228780 A1* | 10/2005 | Diab et al. | 707/3 |
| 2005/0228797 A1 | 10/2005 | Koningstein et al. | |
| 2005/0282473 A1 | 12/2005 | Saito et al. | |
| 2007/0118356 A1 | 5/2007 | Badino | |
| 2008/0059607 A1 | 3/2008 | Schneider | |
| 2009/0157642 A1* | 6/2009 | Diab et al. | 707/4 |

FOREIGN PATENT DOCUMENTS

| | | |
|---|---|---|
| EP | 1014276 A2 | 6/2000 |
| EP | 1160686 | 12/2001 |
| WO | WO 00/79436 | 12/2000 |

OTHER PUBLICATIONS

U.S. Appl. No. 09/493,701, filed Jan. 28, 2000, Weissman et al.

U.S. Appl. No. 10/726,483.

U.S. Appl. No. 60/507,617.

Applied Semantics, "Applied Semantics Launches Contextual Targeting Pay-For-Performance Ad Serving Solution", Applied Semantics—Press Release, Oct. 21, 2002. pp. 1-2, web page at http://www.appliedsemantics.com/ne/ne_pr_102102.html available via the Internet and printed on Aug. 18, 2003.

Applied Semantics, Inc.-Press Release, "Applied Semantics Launches News Series to Power Publishing", web page at http://www.appliedsemantics.com/ne/ne_pr_081302.html as available via the Internet and printed on Aug. 18, 2003.

Chi et al. "Context Query in Information Retrieval", Proceedings of the 14th IEEE International Conference on Tools with Artificial Intelligence. IEEE Comp. Soc. Vol. Conf. 14, Nov. 2002. pp. 101-106.

"CIRCA Technology Overview" Applied Semantics White Paper, Jul. 2001, pp. 1-10.

CONERVA—Products: Retrieval Ware, "RetrievalWare—Optimized Search Precision & Recall" web page at http://www.convera.com/products/rw_precisions.asp as available via the Internet and printed on Oct. 30, 2003.

Fellbaum, C., ed. "WordNet: An Electronic Lexical Database," Cambridge: The MIT Press, Mar. 1998, pp. 117-127, 285-303. P325.5. D38W67 1998.

Geller, M., "Quigo Signs Deal with Overture", *MediaDailyNews*, Aug. 13, 2003, web page at http://www.mediapost.com/dtls_dsp_news.cfm?newsID=215196 available via the Internet and printed on Sep. 21, 2004.

Koll, M.B., "Information Retrieval Theory and Design Based on a Model of the User's Concept Relations", Proceedings of the 3rd Annual ACM Conference on Research and Development in Information Retrieval, 1980, pp. 77-93.

"Ontology Usage and Applications". Applied Semantics Technical White Paper. Jul. 2001, pp. 1-15.

"Powerful Revenue Solutions for Online Publishers", Applied Semantics AdSense. pp. 1.2, brochure, no date.

Tengi, R.I., "Design and Implementation of the WordNet Lexical Database and Searching Software", in *WordNet: An Electronic Lexical Database*, Fellbaum C. ed., Cambridge: The MIT Press, Mar. 1998, pp. 105-127.

"Verity Introduces Customizable Industry and Enterprise Taxonomies". Verity. Nov. 17, 2003, pp. 1-2.

Voorhees, E.M., "Query Expansion Using Lexical-Semantic Relations". Proceedings of the 17th Annual ACM Conference on Research and Development in Information Retrieval, Aug. 1994. pp. 61-69.

Sullivan, D., "AlmondNet Debuts "Post-Search" Search Behavioral Ad Network" web page at http://searchenginewatch.com/searchday/article.php/3464811 as available via the Internet and printed on Feb. 10, 2005.

Kushmerick, N., "Wrapper Induction: Efficiency and expressiveness." Artificial Intelligence, 2000. pp. 15-68, 118, Elsevier Science B.V.

Brin, S. et al., "The Anatomy of a Large-Scale Hypertextual Web Search Engine." 1998. Computer Science Department, Stanford University. Stanford, CA.

Laender, A. et al., "A Brief Survey of Web Data Extraction Tools." 2002, Department of Computer Science, Federal University of Minas Gerais, Belo Horizonte MG Brazil.

Kushmerick, N., "Finite-state approaches to Web information extraction," 2002, Computer Science Department, University College Dublin.

Kushmerick, N. et al., "Adaptive information extraction: Core technologies for information agents," 2002, Computer Science Department, University College Dublin.

Chang, Chia-Hui et al., "IEPAD: Information Extraction Based on Pattern Discovery," 2001. Dept. of Computer Science and Information Engineering, National Central University, Chung-Li, Taiwan.

Muslea, I. et al., "Hierarchical Wrapper Induction for Semistructured Information Sources," 1999, pp. 1-27, Kluwer Academic Publishers, the Netherlands.

Hsu, C. et al., "Generating Finite-State Transducers for Semi-Structured Data Extraction from the Web," Information Systems, 1998, pp. 521-538, vol. 23, No. 8. Elsevier Science Ltd., Great Britain.

Crescenzi, V. et al. "RoadRunner: Towards Automatic Data Extraction from Large Web Sites." Proceedings of the 27$^{th}$ VLDB Conference, 2001, Rome, Italy.

Freitag, D. et al.. "Boosted Wrapper Induction," 2000, American Association for Artificial Intelligence.

White, M. et al., "Multidocument Summarization via Information Extraction." First International Conference on Human Language Technology Research (HLT), 2001.

Delort, J. et al., "Enhanced Web Document Summarization Using Hyperlinks," HT'03, Aug. 26-30, 2003, Nottingham, United Kingdom.

Barroso et al., "Web Search for a Planet: The Google Cluster Architecture," IEEE Computer Society, 2003. pp. 22-28.

Google, "News Results for Search Engines," web page at http://wwwgoogle.com/search?hl=en&ie=UTF-8&a=search+engines, as available via the Internet and printed on Jul. 26, 2004.

Oztekin, U. et al., "Usage Meets Link Analysis: Towards Improving Site Specific and Intranet Search via Usage Statistics." Technical Report, Department of Computer Science and Engineering, University of Minnesota, May 24, 2004.

Czyzowicz, J. et al., "Evaluation of Hotiink Assignment Heuristics for Improving Web Access." Second International Conference on Internet Computing (IC '01), vol. 2. Jun. 25-28, 2001. pp. 793-799., Las Vegas, Nevada, CSREA Press.

Denoue, L. et al., "An annotation tool for Web browsers and its application to information retrieval," Syscom, University de Savoie, France.

Tauscher, L et al., "Revisitation Patterns in World Wide Web Navigation." ACM SIGCHI '97, Proceedings of the Conference on Human Factors in Computing Systems, held in Atlanta, Georgia. Mar. 22-27, ACM Press.

Terveen, L. et al., "A System for Sharing Recommendations," Communications of the ACM. vol. 40, No. 3, Mar. 1997.

Barrett, R. et al., "How to Personalize the Web," Proceedings of the ACM Conference on Human Factors in Computing Systems, 1997.

Kaasten, S. et al., "Designing an Integrated Bookmark/History System for Web Browsing," History Keeping in Computer Applications: A Workshop, held at Human-Computer Interaction Laboratory, University of Maryland, Maryland, Dec. 2, 1999.

Kaasten, S. et al., "Designing an Integrated Bookmark/History System for Web Browsing." Proceeding of the Western Computer Graphics Symposium, Mar. 28-29, 2000.

Kaasten, S. et al., "Integrating Back, History and Bookmarks in Web Browsers," in Extended Abstracts of the ACM Conference of Human Factors in Computing System (Chi '01), 2000.

Staab, S. et al. "An Annotation Framework for the Semantic Web." Proceedings of the First International Workshop on Multimedia Annotation, Tokyo, Japan, Jan. 30-31, 2001.

Middleton, S. et al., "Capturing Knowledge of User Preferences: Ontotogies in Recommender System," Proceedings of the First International Conference on Knowledge Capture (K-CAP). Oct. 2001.

Li, W. et al., "PowerBookmarks: A System for Personalizable Web Information Organization, Sharing, and Management," Sigmod Conference 1999, pp. 565-567.

"A9.com>Company>What's New & Cool" web page at http://a9.com/-/company/whatsCool.lsp, as available via the Internet and printed on Jul. 29, 2004.

"An Annotea Bookmark Schema"web page at http://www.w3.org/2003/07/Annotea/BookmarkScherna-200300707. as available via the Internet and printed on Sep. 28, 2003.

"Annotea: An Open RDF Infrastructure for Shared Web Annotations" web page at http://www.w3.org/2001/Annotea/Papers/www10/annotea.www10.html, as available via the Internet and printed on Sep. 28, 2003.

Maarek, Y, et al., "Automatically Organizing Bookmarks per Contents," Fifth International World Wide Web Conference, Paris, France, May 6-10, 1996 at web page http://www.5conf.inria.fr/fich__html/papers/P37/Overview.html, as available via the Internet and printed on Sep. 28, 2003.

"bk2site" web page at http://bk2site.sourceforge.net/, as available via the Internet and printed on Sep. 28, 2003.

FurlBeta What is Furl web page at http://www.furl.net/learnMore.jsp, as avaialable via the Internet and printed on Jul. 29, 2004.

"iKeepBookmarks.com—A Web-Based Bookmark Manager" web page at http://www.ikeepbookmarks.com/, as available via the internet and printed on Sep. 28, 2003.

"RSS 1.0 channel for bookmark sharing," from Dan Brickleyon Jan. 29, 2001 web page at http://lists.w3.org/Archives/Public/www-annotation/2001Jan.Jun/0002.html, as available via the Internet and printed on Sep. 28, 2003.

Bharat, K. "SearchPad: Explicit Capture of Search Context to Support Web Search" web page at http://www9.org/w9cdrom/173/173.html, as available via the Internet and printed on Sep. 28, 2003.

"TinyURL.com—where tiny is better!" web page at http://tinyurt.com/, as available via the Internet and printed on Nov. 11. 2003.

washingtonpost.com. "Marking a New Tool for Surfers" web page at http:www.washingtonpost.com/ac2/wp-dyn/A132-2000Seo13?language=printer, as available via the Internet and printed on Sep. 28, 2003.

"ZNAIL—for easier living in a virtual world" web page at http://znail.com/, as available via the Internet and printed on Sep. 28, 2003.

Kaasten, S. et al., "How People Recognize Previously Seen WWW Pages from Titles, URLs and Thumbnails" in X. Faulkner, J. Finlay, F. Detienne (Eds) *People and Computers XVI (Proceedings of Human Computer Interaction 2002)*, BCS Conference Series, 247-265, Spriger Verlag at web page http://www.cpsc.ucalgary.ca/grouplab/papers/2002/02-ThumbnailStudy.BHCl/abstract.html, as available via the Internet on Jul. 29, 2004.

Grefenstette, Gregory, "Comparing Two Language Identification Schemes" International Conference on Statistical Analysis of Textual Data, Dec. 11, 1995.

Zhongjian Wang et al., "A Word Segmentation Method with Dynamic Adapting to Text Using Inductive Learning," Association for Computational Linguistics, 2002, pp. 1-5.

International Search Report & Written Opinion for Application No. PCT/US2005/035010, dated May 16, 2006, 15 pages.

* cited by examiner

METHODS AND SYSTEMS FOR AUGMENTING A TOKEN LEXICON

FIELD OF THE INVENTION

The present invention relates generally to text segmentation and, more particularly, to methods and systems for augmenting a token lexicon.

BACKGROUND OF THE INVENTION

Text processing methods and systems exist that attempt to interpret data representing text. Text processing is made more difficult when text comprising a string of characters is received that has no breaks indicating words or other tokens. When processing such strings of characters using existing methods and systems, the characters can be segmented into tokens in order to interpret the string. Tokens can be words, acronyms, abbreviations, proper names, geographical names, stock market ticker symbols, or other suitable symbolic expressions. Generally, a string of characters can be segmented into multiple combinations of segmented strings of characters using existing methods and systems. Recognizing tokens can be made more difficult when a string of characters contains misspellings, abbreviations, unusual terms, or proper names.

SUMMARY

Embodiments of the present invention comprise methods and systems for augmenting a token lexicon. One aspect of one embodiment of the present invention comprises identifying a first token from a search request, storing the first token in a lexicon data storage, receiving a character string comprising a second token, wherein the second token is substantially similar to the first token, and parsing the character string using the lexicon data storage to resolve the second token.

According to another embodiment, a method comprises identifying a first token from an internet article, storing the first token in a lexicon data storage, receiving a character string comprising a second token, wherein the second token is substantially similar to the first token, and parsing the character string using the lexicon data storage to resolve the second token.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for augmenting a token lexicon. There are multiple embodiments of the present invention. By way of introduction and example, one exemplary embodiment of the present invention provides a method for adding tokens to a list of tokens such as a lexicon. Tokens can be words, acronyms, abbreviations, proper names, geographical names, stock market ticker symbols, or other suitable symbolic expressions. The additional tokens can come from a search log containing a record of search queries or from other sources such as web pages, instant messaging dialogs, or chat sessions. Using a search log or other unedited sources of tokens can help identify misspellings, abbreviations, or other unusual or unique tokens to add to the lexicon. The lexicon can then be used to better identify tokens within strings containing misspellings, abbreviations, and unusual or unique tokens.

This introduction is given to introduce the reader to the general subject matter of the application. By no means is the invention limited to such subject matter. Exemplary embodiments are described below.

System Architecture

Figure 1:
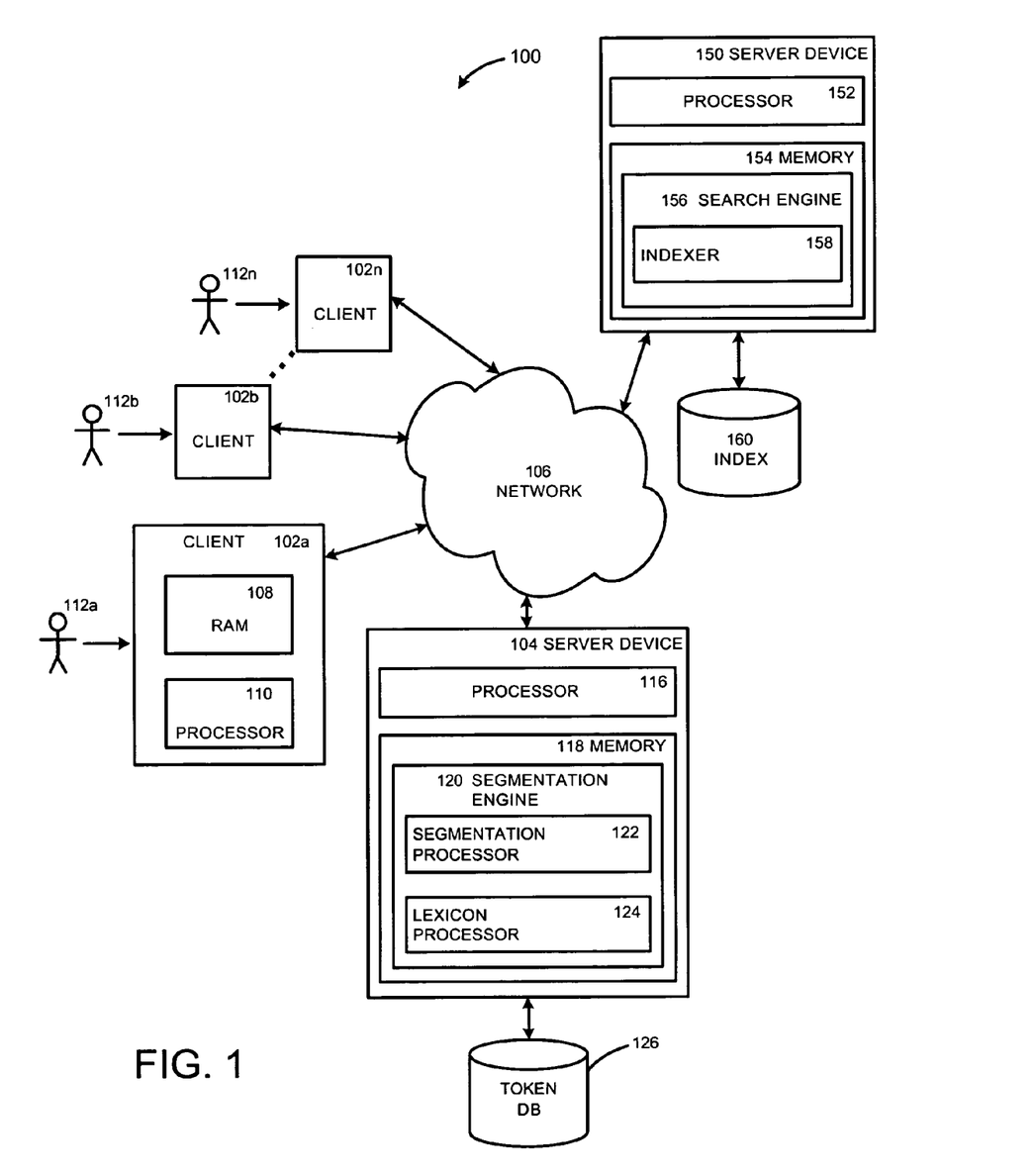
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102a-n in communication with a server device 104 and a server device 150 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown in FIG. 1 each comprise a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic™, Java™, Python, Perl, and JavaScript™.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any suitable type of processor-based platform that is connected to a network 106 and that interacts with one or more application programs. Client devices 102a-n may operate on any operating system capable of supporting a browser or browser-enabled application, such as Microsoft® Windows® or Linux®. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 and a server device 150 are also coupled to the network 106.

The server device 104 can comprise a server executing a segmentation engine application program and server device 150 can comprise a server executing a search engine application program. Similar to the client devices 102a-n, the server device 104 and server device 150 shown in FIG. 1 comprise a processor 116 coupled to a computer-readable memory 118 and a processor 152 coupled to a computer-readable memory 154, respectively. Server devices 104 and 150, depicted as single computer systems, may be implemented as a network of computer processors. Examples of server devices 104, 150 are servers, mainframe computers, networked computers, a processor-based device, and similar types of systems and devices. Client processor 110 and the server processors 116, 152 can be any of a number of computer processors, as described above, such as processors from Intel Corporation of Santa Clara, Calif. and Motorola Corporation of Schaumburg, Ill.

Memory 118 contains a segmentation application program, also known as a segmentation engine 120. The server device 104, or related device, can access the network 106 to receive strings of characters from other devices or systems connected to the network 106. Characters can include, for example, marks or symbols used in a writing system, including data representing a character, such as ASCII, Unicode, ISO 8859-1, Shift-JIS, and EBCDIC or any other suitable character set. In one embodiment, the segmentation engine 120 can receive a string of characters, such as a domain name, from a server device on the network 106 when a user 112a attempts to direct a web browser application to a domain name that is not active.

In one embodiment, the segmentation engine 120 segments the string of characters into potential combinations of tokens and selects a particular combination to associate with the string of characters. A token can comprise a word, a proper name, a geographic name, an abbreviation, an acronym, a stock market ticker symbol, or other suitable symbolic expressions. The segmentation engine 120 can include a segmentation processor 122 and a lexicon processor 124. In the embodiment shown in FIG. 1, each comprises computer code residing in the memory 118.

The segmentation processor 122 can determine a list of potential combinations of tokens or segmented results from the string of characters. In one embodiment, the lexicon processor 124 identifies tokens to add to a lexicon or ontology of tokens. According to one embodiment, the segmentation processor can access likely sources of misspellings, unique or unusual tokens, proper names, and other tokens that may not be a part of an existing lexicon or ontology.

The lexicon processor 124 can add tokens identified by the segmentation processor 122 to a lexicon. A lexicon can comprise, for example, a set of identified tokens that can be stored, for example, in a token database 126 and can be used to help identify possible tokens when parsing new strings of characters. A lexicon can further comprise an ontology, which can comprise, for example, a set of tokens associated with concepts, meanings, and interrelated tokens. For example, a token "baseball" can be associated with the concept of sports and can be further associated with a commonly misspelled form of the word, such as "basebal" for example.

Server device 104 also provides access to other storage elements, such as a token storage element, in the example shown the token database 120. The token database can be used to store tokens and frequency information associated with each token. Data storage elements may include any one or combination of methods for storing data, including without limitation, arrays, hash tables, lists, and pairs. The server device 104 can access other similar types of data storage devices.

The server device 150 can include a server executing a search engine application program, such as the Google™ search engine. In other embodiments, the server device 150 can comprise a related information server or an advertising server. In another embodiment, there can be multiple server devices 150.

Memory 154 contains the search engine application program, also known as a search engine 156. The search engine 156 can locate relevant information from the network 106 in response to a search query from a user 112a and can maintain a search log of search queries. The search engine 156 can provide a search result set to a user 112a or pass a search log of search queries to the segmentation engine 120 via the network 106.

In one embodiment, the server device 150, or related device, has previously performed a crawl of the network 106 to locate articles, such as web pages, stored at other devices or systems coupled to the network 106. Articles include, for example, documents, emails, instant messenger messages, database entries, web pages of various formats, such as HTML, XML, XHTML, Portable Document Format (PDF) files, and media files, such as image files, audio files, and video files, or any other documents or groups of documents or information of any suitable type whatsoever. An indexer 158 can be used to index the articles in memory 154 or on another data storage device, such as an index 160. In one embodiment, there are multiple indexes each containing a portion of the total articles indexed. It should be appreciated that other methods for indexing articles in lieu of or in combination with crawling may be used, such as manual submission.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain method illustrated in FIG. 2.

Process

Various methods in accordance with embodiments of the present invention may be carried out. One exemplary method according to the present invention comprises identifying a first token from a search request, storing the first token in a lexicon data storage, receiving a character string comprising a second token, wherein the second token can be substantially similar to the first token, and parsing the character string using the lexicon data storage to resolve the second token. According to another embodiment the second token can be identical to the first token and can comprise at least one of a misspelled token, a domain name, an abbreviation, and a proper name. According to another embodiment the lexicon can comprise an ontology. According to another embodiment the ontology can comprise a concept associated with the first token and association data indicating an association between the first token and an interrelated token. According to another embodiment the first token can be filtered, which can comprise one or more of identifying a threshold frequency, identifying a minimum number of characters, and restricting to a character set. According to another embodiment the character string can comprise a domain name.

According to another embodiment, a method comprises comprising identifying a first token from an internet article, storing the first token in a lexicon data storage, receiving a character string comprising a second token, wherein the second token can be substantially similar to the first token, parsing the character string using the lexicon data storage to resolve the second token. According to another embodiment the Internet article can comprise one or more of an instant messaging dialog, a chat session, or a web page. According to another embodiment the second token can be identical to the first token and can comprise at least one of a misspelled token, a domain name, an abbreviation, and a proper name. According to another embodiment the lexicon can comprise an ontology. According to another embodiment the ontology can comprise a concept associated with the first token and association data indicating an association between the first token and an interrelated token. According to another embodiment the first token can be filtered, which can comprise one or more of identifying a threshold frequency, identifying a minimum number of characters, and restricting to a character set. According to another embodiment the character string can comprise a domain name.

Figure 2:
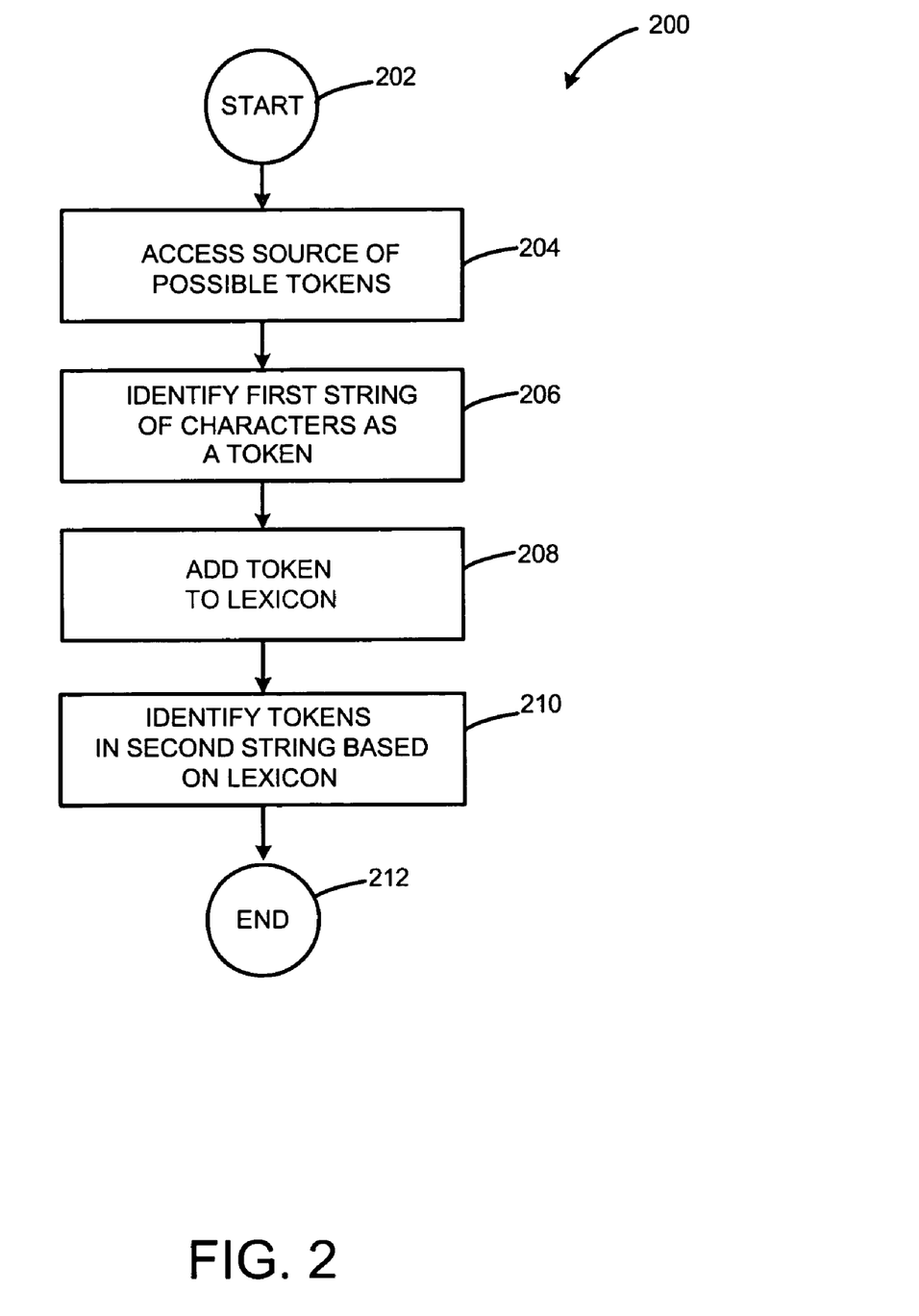
FIG. 2 illustrates a flow diagram of one embodiment of a method carried out by the present invention.

FIG. 2 illustrates an exemplary method 200 for improving text segmentation by identifying tokens from a data source and adding the tokens to a lexicon. This exemplary method is provided by way of example, as there are a variety of ways to carry out methods according to the present invention. The method 200 shown in FIG. 2 can be executed or otherwise performed by one or a combination of various systems. The method 200 is described below as carried out by the system 100 shown in FIG. 1 by way of example, and various elements of the system 100 are referenced in explaining the example method of FIG. 2.

Referring to FIG. 2, in block 202, the example method 200 begins. Following block 202, the method 200 proceeds to block 204, wherein the segmentation processor 122 accesses a source of possible tokens. Accessing a source of possible tokens can comprise, for example, accessing a search log of search queries from the server device 150, accessing articles on the network 106 such as emails, instant messages, web pages, mailing list archives, and other suitable sources of tokens. According to one embodiment, accessing a source of possible tokens can comprise accessing a source likely to contain unedited or unconventional tokens. For example, a search log of search queries can contain search terms that have not been edited for misspellings, etc. The search log can therefore contain a record of misspelled tokens that can be used to supplement a token lexicon. As another example, web pages can contain words, expressions, symbols and terminology unique to an Internet setting that may not be available in traditional lexicons. Also, instant messaging and chat articles can contain proper names and other tokens likely to be unique and thus less likely to appear in traditional lexicons.

Once the segmentation processor 122 accesses a source of possible tokens, the method 200 proceeds to block 206, wherein the segmentation processor 122 identifies a first string within the source of possible tokens as a token. Identifying a first string as a token can comprise, for example, identifying a character such as a space separating tokens within the data source. For example, a search log of search queries can contain the search query "harmon kardon amplifilers." The segmentation processor 122 can identify three separate tokens—"harmon," "kardon," and "amplifilers"—within the search query based on the spacing between the search terms. According to other embodiments, other suitable criteria or delineators can be used to identify tokens within a string of characters. According to one embodiment, a source of pre-segmented text can be used. For example, the search engine 156 can store a history of search queries each of which comprises one or more tokens than can be used by the lexicon processor 124 directly to supplement a token lexicon.

Once the segmentation processor 122 identifies a first string as a possible token, the method 300 proceeds to block 208, wherein the lexicon processor 124 adds the token to a lexicon. Adding the token to a lexicon can comprise, for example, filtering the token and storing the token in a lexicon data storage such as the token database 126. Filtering the token can be used to improve efficiency and can comprise, for example, determining a threshold frequency for the token determining minimum requirements for the token, or using another suitable filtering criterion. For example, a frequency for the token can be determined by identifying how many times the token appears in a sample set of articles on the network 106. To facilitate identifying a frequency for a token, the lexicon processor can access the index 160 attached to the server device 150. According to another embodiment, the lexicon processor can access a separate frequency database or crawl the network to determine a frequency on the fly.

According to another embodiment, filtering based on frequency can comprise determining that a token appears a minimum number of times in a source, such as in a search log, prior to adding the token to a database. Thus, for example, it can be identified that the misspelled token "amplifilers" appears a sufficient number of times in a search log and the token "amplifilers" can then be added to a lexicon.

Filtering tokens based on minimum requirements for a token can comprise, for example, a minimum number of characters or restricting characters to a specific character set. For example, a minimum requirement can be set that a token contain at least three letters or that a token contain at least one of a certain type of character such as a letter or number, for example. As another example, a requirement can be set that a token comprise characters from a particular character set, such as English letters or symbols for example. According to another embodiment, all tokens can be added to the token database 126 without filtering.

Adding the token to the token database 120 can comprise including the token in a lexicon of tokens. The lexicon of tokens can comprise a simple listing of all tokens or can further contain additional data associated with each token. According to one embodiment, the lexicon can comprise an ontology containing meanings and concepts associated with each token and allowing relationships and associations between tokens to be identified and stored. For example, the ontology can associate tokens comprising misspellings or alternate spellings with a token comprising a correct or preferred spelling. Thus, in the example above where the segmentation processor 122 identifies the tokens "harmon," "kardon," and "amplifilers," the token "amplifilers" can be associated with the correctly spelled token "amplifiers."

Additionally, the token "amplifilers" can be associated with concepts associated with the correctly spelled "amplifiers," which can include, for example, consumer electronics, stereo equipment, and music.

In order to identify which correctly spelled token a misspelled token should be associated with, the lexicon processor 124 can utilize a spell checking application program also known as a spell checker. The spell checker can reside in memory 118 on the server device 104 or on another device in communication with the lexicon processor 124.

Once the lexicon processor 124 adds the token to the lexicon, the method 200 proceeds to block 210, wherein the segmentation processor identifies at least one token in a second string based on the tokens in the lexicon. Identifying the token in the second string can comprise, for example, resolving tokens within the second string by identifying tokens that are identical or substantially similar to the tokens in the lexicon. For example, the segmentation processor 122 can receive from the client device 102a a string comprising text, such as a domain name, entered by the user 112a into a URL field of a web browser application. A domain name can comprise an actual domain name that is misspelled, a domain name that cannot be found or does not exist on the network 106, or any other suitable domain name that may or may not be located by a server device. For example, the user 112a can enter the text "hoffmanamplifilers" into the URL field of a web browser application on the client device 102a. The web browser may be unable to resolve the URL request because the URL was misspelled or because it does not exist. The segmentation processor 122 can receive the text "hoffmanamplifilers" from the client device 102a and identify that the tokens "hoffman," and "amplifiers'" from the lexicon in the token database 126 are contained in the string "hoffmanamplifilers."

Recognizing the token "amplifiers" can be facilitated by the earlier addition of the token "amplifiers" to the lexicon. For example, a search log can indicate that users on the network 106 commonly misspell the term "amplifiers." The search log can indicate that "amplifilers," for example, is a common misspelling of "amplifiers" and the token "amplifilers" can be added to the lexicon. Once the token is added, the text "hoffmanamplifilers" can be entered by the user 112a as a URL. The URL string "hoffmanamplifilers" can be separated based in part on identifying the token "amplifiers" that was added to the lexicon from the search log and then parsing the remaining portion of the string into the token "hoffman."

According to some embodiments, the segmentation processor can then associate the token "amplifiers" with the correctly spelled "amplifiers" and use the correctly spelled token "amplifiers" together with "hoffman" to identify an existing web page likely to be responsive to the URL the user 112a attempted to access, even though the terms "hoffman amplifiers" may not have explicitly appeared together in a previous search query, based on correctly identifying the token "amplifiers" from the misspelled token "amplifiers" and parsing the remaining token "hoffman."

According to other embodiments, the segmentation processor 122 can receive the second string from the server device 150, over the network 106, or from another suitable source of data to be parsed based on the tokens in the lexicon in the token database 126. Once the segmentation processor 122 identifies tokens in a second string based on the lexicon, the method 200 proceeds to block 212, wherein the exemplary method 200 ends.

General

While the above description contains many specifics, these specifics should not be construed as limitations on the scope of the invention, but merely as exemplifications of the disclosed embodiments. Those skilled in the art will envision any other possible variations that are within the scope of the invention.

That which is claimed:

1. A computer-implemented method, comprising:
receiving a character string in an alphanumeric format having no token-delineating breaks and comprising one or more tokens in the alphanumeric format; and
for each of the one or more tokens, parsing the received character string into a first portion containing a first token and a second portion containing the remaining tokens;
   identifying the first token in one or more logs associated with multiple previously received search requests;
   determining a frequency with which the identified first token appears in the one or more logs;
   determining whether the determined frequency with which the identified first token appears in the one or more logs exceeds a first threshold level; and
   storing the identified first token in a lexicon data storage based on the determination of whether the determined frequency with which the identified first token appears in the one or more logs exceeds the first threshold level, wherein the lexicon data storage comprises an ontology associating at least one of a misspelling of the first token with a correct spelling, or an alternate spelling of the first token with a different spelling.

2. The computer-implemented method of claim 1, wherein the first token comprises at least one of a misspelled word, a domain name, an abbreviation, or a proper name.

3. The computer-implemented method of claim 1, wherein the ontology associates the first token with at least one interrelated token.

4. The computer-implemented method of claim 1, wherein storing the identified first token in the lexicon data storage comprises storing the identified first token in the lexicon data storage when the multiple previously received search requests exceed the first threshold level, when the identified first token comprises more than a second threshold level of characters, or when characters in the identified first token are included in a specific character set.

5. The computer-implemented method of claim 1, wherein the character string comprises a domain name.

6. A computer-implemented method, comprising:
identifying a character string in an alphanumeric format having no token delineating breaks and comprising one or more tokens in the alphanumeric format from an internet-accessible article; and
for each of the one or more tokens, parsing the identified character string into a first portion containing a first token and a second portion containing the remaining tokens;
   determining a first frequency with which the first token appears in the internet-accessible article, or a second frequency with which the first token appears at least once in a number of different internet-accessible articles;
   determining whether the determined first frequency with which the first token appears in the internet-accessible article exceeds a first threshold level, or whether the determined second frequency with which the first token appears at least once in the number of different internet-accessible articles exceeds a second threshold level; and storing the first token in a lexicon data storage based on the determination of whether the determined first frequency with which the first token appears in the internet-accessible article exceeds the first threshold level, or whether the determined second frequency with which the first token appears at least once in the number of different internet-accessible articles exceeds the second threshold level, wherein the lexicon data storage comprises an ontology associating at least one of a misspelling of the first token with a correct spelling, or an alternate spelling of the first token with a preferred spelling.

7. The computer-implemented method of claim 6, wherein the internet-accessible article comprises at least one of an instant messaging dialog, a chat session, a mailing list archive, and a web page.

8. The computer-implemented method of claim 6, wherein the first token comprises at least one of a misspelled word, a domain name, an abbreviation, or a proper name.

9. The computer-implemented method of claim 6, wherein the ontology associates the first token with at least one interrelated token.

10. The computer-implemented method of claim 6, wherein the character string comprises a domain name.

11. A computer-implemented method comprising:
identifying a character string in an alphanumeric format having no token delineating breaks and comprising one or more tokens in the alphanumeric format, wherein the identified character string is included in a plurality of previously received search requests;
for each of the one or more tokens, parsing the identified character string into a first portion containing a first token and a second portion containing the remaining tokens;
determining whether the first token is already included in a lexicon comprising an ontology of interrelated tokens and whether the first token occurs in the plurality of previously received search requests with at least a threshold frequency;
based upon the determination of whether the first token is already included in the lexicon and the determination of whether the first token occurs in the plurality of previously received search results with at least the threshold frequency, identifying a second token that comprises a correct spelling of the first token, or an alternate spelling of the first token; and
adding the first token to the lexicon with an association to the identified second token;
receiving an alphanumeric string of characters comprising a domain name and having no token-delineating breaks;
matching a portion of the received alphanumeric string of characters to the first token using the lexicon; and
replacing the matched portion of the received alphanumeric string of characters with the identified second token contained in the lexicon.

12. The computer-implemented method of claim 11, wherein the second token is identified in response to determining that (i) the first token is not already included in the lexicon and (ii) the first token occurs in the plurality of previously received search results with at least the threshold frequency.

13. The computer-implemented method of claim 11, wherein the second token is identified as the correct spelling of the first token, or the alternate spelling of the first token using a spell checker.

14. The computer-implemented method of claim 11, wherein the portion of the received alphanumeric string of characters is matched to the first token using the lexicon in response to a failed attempt to resolve the domain name.

15. A non-transitory computer-readable storage device comprising program code that, when executed, causes a processor to perform operations comprising:
receiving a character string in an alphanumeric format having no token-delineating breaks and comprising the first token one or more tokens in the alphanumeric format; and
for each of the one or more tokens, parsing the received character string into a first portion containing a first token and a second portion containing the remaining tokens;
identifying the first token in one or more logs associated with multiple previously received search requests;
determining a frequency with which the identified first token appears in the one or more logs;
determining whether the determined frequency with which the identified first token appears in the one or more logs exceeds a first threshold level; and
storing the identified first token in a lexicon data storage based on the determination of whether the determined frequency with which the identified first token appears in the one or more logs exceeds the first threshold level, wherein the lexicon data storage comprises an ontology associating at least one of a misspelling of the first token with a correct spelling, or an alternate spelling of the first token with a preferred spelling.

16. The non-transitory computer-readable storage device of claim 15, wherein the first token comprises at least one of a misspelled word, a domain name, an abbreviation, or a proper name.

17. The non-transitory computer-readable storage device of claim 15, wherein the ontology associates the first token with an interrelated token.

18. The non-transitory computer-readable storage device of claim 15, wherein storing the identified first token in the lexicon data storage comprises storing the identified first token in the lexicon data storage when the multiple previously received search requests exceed the first threshold level, when the identified first token comprises more than a second threshold level of characters, or when characters in the identified first token are included in a specific character set.

19. The non-transitory computer-readable storage device of claim 15, wherein the character string comprises a domain name.

20. A non-transitory computer-readable storage device comprising program code that, when executed, causes a processor to perform operations comprising:
identifying a character string in an alphanumeric format having no token delineating breaks and comprising one or more tokens in the alphanumeric format from an internet-accessible article; and
for each of the one or more tokens, parsing the identified character string into a first portion containing a first token and a second portion containing the remaining tokens;
determining a first frequency with which the first token appears in the internet-accessible article, or a second frequency with which the first token appears at least once in a number of different internet-accessible articles;
determining whether the determined first frequency with which the first token appears in the internet-accessible article exceeds a first threshold level, or whether the determined second frequency with which the first token appears at least once in the number of different internet-accessible articles exceeds a second threshold level; and storing the first token in a lexicon data storage based on the determination of whether the determined first frequency with which the first token appears in the internet-accessible article exceeds the first threshold level, or whether the determined second frequency with which the first token appears at least once in the number of different internet-accessible articles exceeds the second threshold level, wherein the lexicon data storage comprises an ontology associating at least one of a misspelling of the first token with a correct spelling, or an alternate spelling of the first token with a preferred spelling.

21. The non-transitory computer-readable storage device of claim 20, wherein the internet-accessible article comprises at least one of an instant messaging dialog, a chat session, a mailing list archive, and a web page.

22. The non-transitory computer-readable storage device of claim 20, wherein the first token comprises at least one of a misspelled word, a domain name, an abbreviation, or a proper name.

23. The non-transitory computer-readable storage device of claim 20, wherein the ontology associates the first token with an interrelated token.

24. The non-transitory computer-readable storage device of claim 20, wherein the character string comprises a domain name.

25. A non-transitory computer-readable storage device comprising program code that, when executed, causes a processor to perform operations comprising:

identifying a character string in an alphanumeric format having no token delineating breaks and comprising one or more tokens in the alphanumeric format, wherein the identified character string is included in a plurality of previously received search requests;

for each of the one or more tokens, parsing the identified character string into a first portion containing a first token and a second portion containing the remaining tokens;

determining whether the first token is already included in a lexicon comprising an ontology of interrelated tokens and whether the first token occurs in the plurality of previously received search requests with at least a threshold frequency;

based upon the determination of whether the first token is already included in the lexicon and the determination of whether the first token occurs in the plurality of previously received search results with at least the threshold frequency, identifying a second token that comprises a correct spelling of the first token, or an alternate spelling of the first token; and adding the first token to the lexicon with an association to the identified second token;

receiving an alphanumeric string of characters comprising a domain name and having no token-delineating breaks;

matching a portion of the received alphanumeric string of characters to the first token using the lexicon; and replacing the matched portion of the received alphanumeric string of characters with the identified second token contained in the lexicon.

26. The non-transitory computer-readable storage device of claim 25, wherein the second token is identified in response to determining that (i) the first token is not already included in the lexicon and (ii) the first token occurs in the plurality of previously received search results with at least the threshold frequency.

27. The non-transitory computer-readable storage device of claim 25, wherein the second token is identified as the correct spelling of the first token, or the alternate spelling of the first token using a spell checker.

28. The non-transitory computer-readable storage device of claim 25, wherein the portion of the received alphanumeric string of characters is matched to the first token using the lexicon in response to a failed attempt to resolve the domain name.

* * * * *

UNITED STATES PATENT AND TRADEMARK OFFICE
CERTIFICATE OF CORRECTION

| | | |
|---|---|---|
| PATENT NO. | : 8,051,096 B1 | Page 1 of 1 |
| APPLICATION NO. | : 10/954714 | |
| DATED | : November 1, 2011 | |
| INVENTOR(S) | : Gilad Israel Elbaz and Jacob L. Mandelson | |

It is certified that error appears in the above-identified patent and that said Letters Patent is hereby corrected as shown below:

ON THE TITLE PAGE:

ITEM (57) (Abstract) Line 9, delete, "interne" and insert --internet--, therefore.

IN THE CLAIMS:

Column 10, Lines 7-8, in claim 15, after "comprising" delete "the first token".

Signed and Sealed this

Twentieth Day of December, 2011

David J. Kappos
*Director of the United States Patent and Trademark Office*